United States Patent
Nagano et al.

(10) Patent No.: US 6,257,050 B1
(45) Date of Patent: Jul. 10, 2001

(54) EVAPORATIVE FUEL LEAK DIAGNOSING APPARATUS

(75) Inventors: Susumu Nagano, Hyogo (JP); Martin Oakes, Freeport, IL (US)

(73) Assignees: Mitsubishi Denki Kabushiki Kaisha, Tokyo (JP); Honey Well, Inc., Minneapolis, MN (US)

( * ) Notice: Subject to any disclaimer, the term of this patent is extended or adjusted under 35 U.S.C. 154(b) by 0 days.

(21) Appl. No.: 09/262,887

(22) Filed: Mar. 8, 1999

Related U.S. Application Data
(60) Provisional application No. 60/077,410, filed on Mar. 9, 1998.

(51) Int. Cl.⁷ ............................ G01M 3/32; G01M 15/00; F02M 25/08; G01R 7/10

(52) U.S. Cl. ............................ 73/47; 73/49.7; 73/49.2 T; 73/118.1; 123/520

(58) Field of Search ................. 73/47, 49.7, 49.2 T, 73/40.5 R, 118.1; 123/520

(56) References Cited

U.S. PATENT DOCUMENTS

| | | | |
|---|---|---|---|
| 4,873,655 | 10/1989 | Kondraske | 364/553 |
| 4,884,215 | 11/1989 | Zboralski et al. | 364/510 |
| 4,986,243 | 1/1991 | Weissler, II et al. | 123/488 |
| 5,361,218 | 11/1994 | Tripp et al. | 364/571.01 |
| 5,396,873 | * 3/1995 | Yamanaka et al. | 123/520 |
| 5,408,866 | * 4/1995 | Kawamura et al. | 73/40 |
| 5,419,299 | * 5/1995 | Fukasawa et al. | 123/520 |
| 5,467,641 | * 11/1995 | Williams et al. | 73/49.7 |
| 5,507,176 | * 4/1996 | Kammer et al. | 73/49.2 |
| 5,750,888 | * 5/1998 | Matsumoto et al. | 73/118.1 |
| 5,850,819 | * 12/1998 | Kunimitsu et al. | 123/520 |
| 6,016,690 | * 1/2000 | Cook et al. | 73/49.2 |
| 6,044,314 | * 3/2000 | Cook et al. | 701/31 |

FOREIGN PATENT DOCUMENTS
5-118944   5/1993   (JP).

OTHER PUBLICATIONS

Honeywell, "Precision Pressure Transducers PPT and PPT–R", Honeywell Pressure Products, 900131 Rev. F, (2/96), pp. 1–4, Honeywell Solid State Electronics Center, Plymouth, MN, USA.

Honeywell, "Micro Switch Pressure Sensors Autozeroing Techniques", Application Sheet 008031–1–EN, IL50 GLO (7/97), Micro Switch, Honeywell Inc., Freeport, IL, USA.

Machul et al, "A Smart Pressure Transducer with On–Chip Readout, Calibration and Nonlinear Temperature Compensation Based on Spline–Functions", 1997 IEEE International Solid–State Circuits Conference Digest of Technical Papers, (2/97), pp. 198–199, John H. Wuorinen, Castine, ME, USA.

(List continued on next page.)

Primary Examiner—Hezron Williams
Assistant Examiner—David J. Wiggins
(74) Attorney, Agent, or Firm—Sughrue, Mion, Zinn Macpeak & Seas, PLLC

(57) ABSTRACT

An evaporative fuel leak diagnosing apparatus for an internal combustion engine, which can detect a pressure of concern with high accuracy with a structure implemented inexpensively while ensuring high accuracy for the detection of fuel vapor. The apparatus includes a computer unit (50A) for fetching directly non-linear outputs of a pressure sensor (6A), determining a pressure detection value within a furl tank (1) on the basis of the non-linear output value of the pressure sensor (6A) and data registered previously on the basis of the non-linear output value of the pressure sensor (6A) as fetched from the computer unit for use in evaluating the actual pressure corresponding to a noted pressure sensor value.

8 Claims, 12 Drawing Sheets

OTHER PUBLICATIONS

Flammini et al, *"Transducer output signal processing using an optimal look-up table in microcontroller-based systems"*, Electronics Letters, (Jul. 3, 1997), vol. 33, No. 14, pp. 1197–1198.

Lloyd et al, *"An Adaptive Calibration Technique For Micromachined Pressure Sensors"*, Transducers 97, 1997 International Conference on Solid–State Sensors and Actuators Digest of Technical Papers, (6/97), vol. 1, Paper 2A102, pp. 295–298, 1997 IEEE.

Obermeier et al, *"A Smart Pressure Sensor with On–Chip Calibration and Compensation Capability"*, Sensors (3/95), pp. 22–11, 52–53, Sensors, Peterborough, NH, USA.

\* cited by examiner

OUTPUT ERROR WHEN FULL SCALE IS SET TO 8KPa

Vcc = 5V
Vabfs = 4V

EVAPORATIVE FUEL LEAK DIAGNOSING APPARATUS

The present application and any patent issuing thereon claims the benefit of priority under 35 USC 119 with regard to U.S. provisional application S. No. 60/077,410 filed on Mar. 9, 1998.

BACKGROUND OF THE INVENTION

1. Field of the Invention

The present invention relates to an apparatus for diagnosing leakage of evaporative fuel contained in a fuel tank and fed to an intake or induction system of an internal combustion engine.

2. Description of Related Art

For having better understanding of the concept underlying the present invention, technical background thereof will first be reviewed in some detail. FIG. 19 is a schematic diagram showing a structure of a conventional evaporative fuel leak diagnosing apparatus for an internal combustion engine which is disclosed in Japanese Unexamined Patent Application Publication No. 159158/1994 (JP-A-6-159158). Referring to the figure, a fuel tank 1 contains an evaporative fuel 1a. A fuel pipe system 2 is disposed between the fuel tank 1 and an intake or induction manifold (not shown) of the internal combustion engine (not shown either). The fuel pipe system 2 is constituted by fuel pipes 2a, 2b and 2c disposed sequentially in this order as viewed from the side of the fuel tank. A check valve 7 is installed between the fuel pipes 2a and 2b, while installed between the fuel pipes 2b and 2c is a canister 3 for adsorbing fuel vapor. Further, a purge cut valve 4 is provided at the intake manifold side of the engine.

The canister 3 is provided with a drain cut valve 5 for allowing the canister 3 to be selectively communicated to the atmosphere. Additionally, a pressure sensor 6 is mounted on a blanch pipe 2d at a free end thereof. The purge cut valve 4, the drain cut valve 5 and the pressure sensor 6 are electrically connected to a computer unit 50 installed for controlling operations of the internal combustion engine.

Next, description will turn to operations of the evaporative fuel leak diagnosing apparatus.

When the fuel vapor pressure exceeds a preset level at which the check valve 7 is forced to open, the fuel vapor generated within the fuel tank 1 is introduced into the canister 3 by way of the fuel pipe 2a, the check valve 7 and the fuel pipe 2b. The fuel vapor fed to the canister 3 is adsorbed by an adsorbent therein. When the engine is put into operation, the purge cut valve 4 is opened, whereby the fuel adsorbed is purged into the intake manifold of the engine by way of the fuel pipe 2c and the purge cut valve 4. In this manner, fuel vapor generated within the fuel tank 1 ultimately undergoes combustion within the engine cylinders. With the evaporative fuel emission preventing arrangement described above, emission of the evaporative fuel to the atmosphere and hence environmental pollution due to the fuel vapor emission can be prevented.

The pressure sensor 6 is employed for detecting the pressure within the fuel tank 1 in the system-closed-state in which both the drain cut valve 5 and the purge cut valve 4 are closed. The detection signal outputted from the pressure sensor 6 is supplied to the computer unit 50 for detecting the leakage of the fuel vapor by checking whether the rate of pressure increase or rise within the fuel tank 1 exceeds or does not exceed a predetermined value The pressure sensor 6 used to this end exhibits ordinarily such a linear characteristic as illustrated in FIG. 6.

Needless to say, a fault or defect may occur in the pipes which are usually formed of rubber or the like or at juncture (s) between the pipes and/or parts constituting the evaporative fuel emission preventing apparatus. In that case, the fuel vapor will leak through the faulty or defective portion into the atmosphere. The pressure sensor 6 is provided for the purpose of detecting such leakage and emission of the fuel vapor.

Incidentally, according to the recommendation issued recently by the Environmental Protection Agency of the U.S.A., installation of such fuel vapor detection facility is required for checking whether or not the evaporative fuel emission preventing apparatus is operating normally.

As can readily be understood, the pressure sensor employed in the evaporative fuel leak diagnosing apparatus for the internal combustion engine is required to exhibit a high sensitivity. That is, the pressure sensor should be so designed as to be able to respond to a feeble or minute pressure change with a large output. To this end, a diaphragm constituting a sensing element of the pressure sensor is implemented in a reduced thickness with a large pressure receiving surface (or large diameter) to thereby ensure high sensitivity.

In this conjunction, it is however noted that the reduced thickness of the diaphragm serving as the sensor element involves deterioration in the linearity of the output characteristic of the pressure sensor. For this reason, in the conventional evaporative fuel leak diagnosing apparatus for the internal combustion engine known heretofore, hardware-wise measures are adopted to compensate for deterioration in the linearity of the output characteristic while taking into consideration the S/N ratio of the sensor output signal. Consequently, the conventional evaporative fuel leak diagnosing apparatus is very expensive. Besides, limitation is naturally encountered in the effort for increasing the sensitivity of the pressure sensor.

SUMMARY OF THE INVENTION

In the light of the state of the art described above, it is an object of the present invention to provide an evaporative fuel leak diagnosing apparatus for an internal combustion engine which can detect a pressure of concern with high accuracy and reliability in a structure implemented inexpensively, to thereby ensure high accuracy for the detection of leakage of the fuel vapor.

In view of the above and other objects which will become apparent as the description proceeds, there is provided according to an aspect of the present invention an evaporative fuel leak diagnosing apparatus for an internal combustion engine, which apparatus includes a pressure sensor means for detecting a pressure within a fuel tank containing an evaporative fuel to be supplied to the internal combustion engine through an intake manifold, a fuel tank seal-off means for isolating hermetically the fuel tank from the intake manifold and the atmosphere, and a computer means for fetching directly nonlinear output of the pressure sensor in a state where the fuel tank is hermetically isolated by the seal-off means, determining a pressure detection value indicative of a pressure level prevailing within the fuel tank on the basis of the non-linear output value obtained from the pressure sensor and data registered previously on the basis of the non-linear output values of the pressure sensor, and making decision as to leakage of the evaporative fuel on the basis of a rate at which the pressure detection value increases.

By virtue of the arrangement of the evaporative fuel leak diagnosing apparatus described above, the non-linear output of the pressure sensor can be made use of without need for correcting non-linearity thereof, whereby the external circuit (s). Required heretofore for the linearization processing can be spared. Besides, in designing the sensor element, no consideration needs to be paid for designing the sensor element so that it exhibits minimum possible linearity. Thus, the pressure sensor of high sensitivity can be used, whereby the evaporative fuel leak diagnosing apparatus for the internal combustion engine can be realized inexpensively while ensuring enhanced leakage detection accuracy.

In a preferred mode for carrying out the invention, a plurality of output values generated by the pressure sensor in response to a plurality of pressure values applied to the pressure sensor, respectively, may be registered in advance in the computer means for use the data to be referenced against. In that case, when a pressure value corresponding to any one of the plural registered computer means for use in evaluating the internal pressure corresponding to a noted output values is fetched from the output of the pressure sensor, the registered pressure value corresponding to the output value may be used as the applied pressure detection value, while when the output value corresponding to none of the plural registered output values is fetched from the computer means for use in evaluating the actual pressure corresponding to the output of the pressure sensor, the pressure detection value may be arithmetically determined by resorting to an interpolation processing based on the plural registered output values and the applied pressure values corresponding thereto.

Owing to the arrangement described above, the fuel vapor pressure detection can be performed with high accuracy even when the data registered previously in the computer means are discrete, to another advantageous effect.

In another preferred mode for carrying out the invention, the computer means may arithmetically determine the detection value of pressure within the fuel tank in accordance with polygonal-line approximating expressions which can approximate output behavior of the pressure sensor and which polygonal-line approximating expresions are registered previously in the computer means.

With the arrangement described above, the fuel vapor pressure detection can be performed with high accuracy even when the data registered previously in the computer means are discontinuous or discrete, to a further advantageous effect.

In yet another preferred mode for carrying but the invention, a plurality of output values generated by the pressure sensor in response to a plurality of pressure values applied to the pressure sensor and correcting quantities therefor may be registered for use as data previously in the computer means. In that case, when a pressure value corresponding to any one of the plural registered output values is fetched from the output of the pressure sensor, the pressure detection value may be arithmetically determined on the basis of the output pressure value and the registered correcting quantity corresponding to the output pressure value, while when the output value corresponding to none of the plural registered output values is fetched from the output of the pressure sensor, the pressure detection value may be arithmetically determined by resorting to interpolation processing based on the plural registered output values and the correcting quantities corresponding thereto.

By virtue of the above arrangement, the fuel vapor pressure detection can be realized with high accuracy even when the data registered previously in the computer means are discrete, to yet another advantageous effect.

In a further preferred mode for carrying out the invention, the pressure sensor may be so designed as to be composed of a diaphragm having pressure receiving surfaces exposed to atmosphere and interior of the fuel tank, respectively, and gauge resistors for detecting distortion of the pressure receiving surface, respectively.

With the arrangement of the evaporative fuel leak diagnosing apparatus described above, the pressure sensor of high sensitivity can easily be realized by altering the size or area of the pressure receiving surface of the diaphragm and the thickness thereof, to a further advantage.

In summary, with the evaporative fuel leak diagnosing apparatus according to the invention, the pressure detection signal can be utilized without need for correcting the non-linear characteristic of the pressure sensor. Thus, the external circuit required in the conventional evaporative fuel leak diagnosing,apparatus for the linearization processing can be spared according to the invention. Moreover, in designing the sensor element, essentially no attention need be paid to the suppression of the non-linearity of the sensor element. Nevertheless, the pressure sensor of very high sensitivity can be realized, which of course contributes to inexpensive fabrication of the evaporative fuel leak diagnosing apparatus for the internal combustion engine capable of ensuring high reliability.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
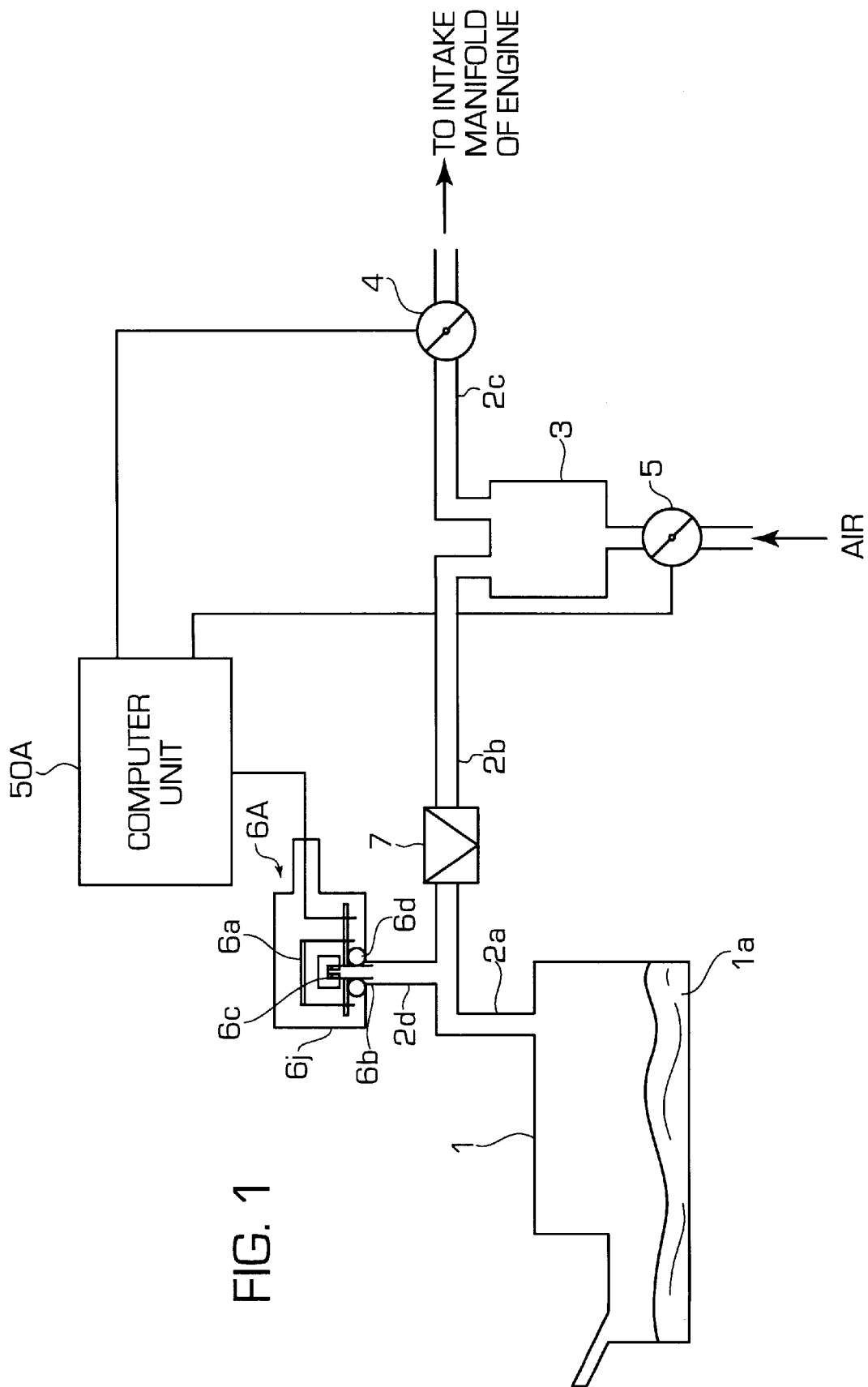
FIG. 1 is a schematic diagram showing an evaporative fuel leak diagnosing apparatus according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

Figure 19:
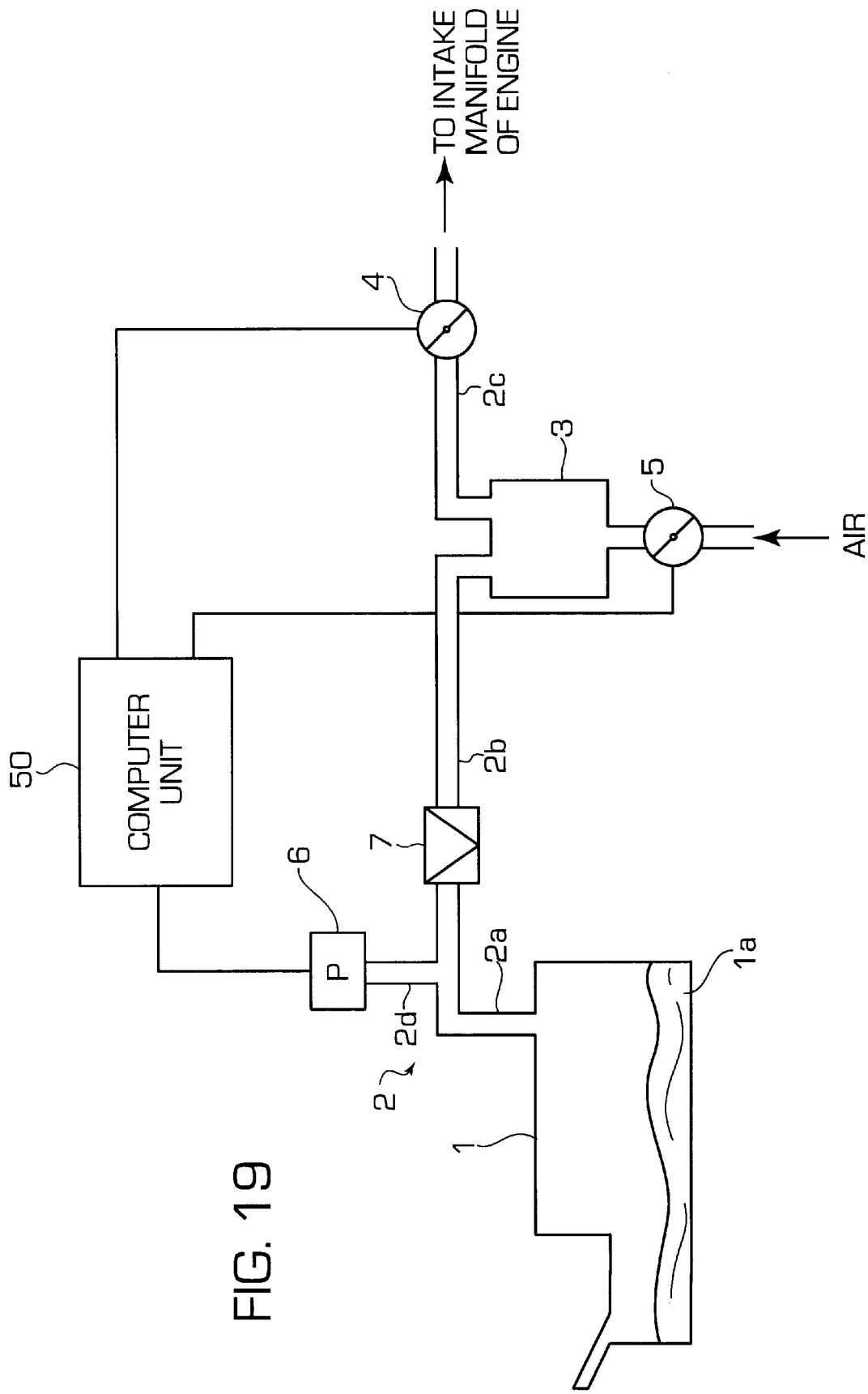
FIG. 19 is a schematic diagram showing a conventional evaporative fuel leak diagnosing apparatus for an internal combustion engine.

FIG. 1 is a schematic diagram showing an evaporative fuel leak diagnosing apparatus according to a first embodiment of the present invention. The evaporative fuel leak diagnosing apparatus shown in FIG. 1 is implemented generally in a similar arrangement as the conventional apparatus shown in FIG. 19. Parenthetically, the pressure sensor 6A1 is shown in more detail when compared with the one shown in FIG. 19. Further, in FIG. 1, components like as or equivalent to those described hereinbefore by reference to FIG. 19 are designated by like reference characters and repeated description in detail of these components is omitted. Furthermore, the drain cut valve 5 and the purge cut valve 4 cooperate to constitute a seal-off means for hermetically sealing off or isolating the fuel tank 1 from the intake manifold and the atmosphere.

Figure 2:
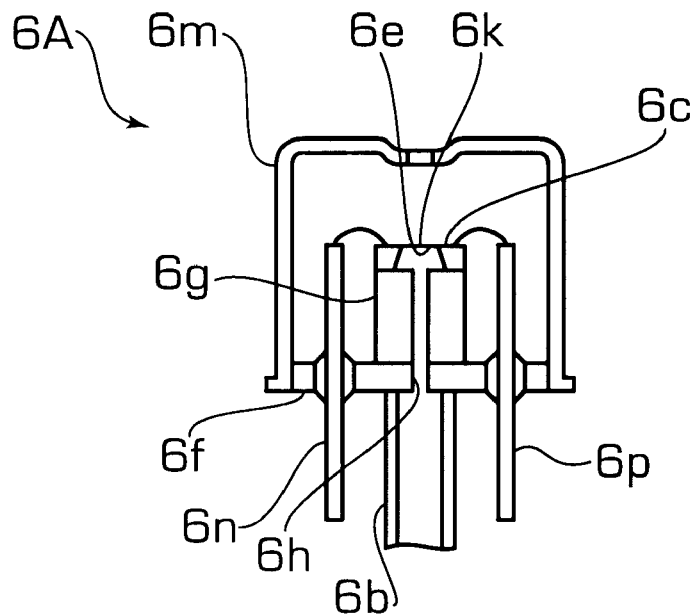
FIG. 2 is a side elevational view showing schematically in section a structure of a pressure sensor employed in the evaporative fuel leak diagnosing apparatus according to the invention.
Figure 3:
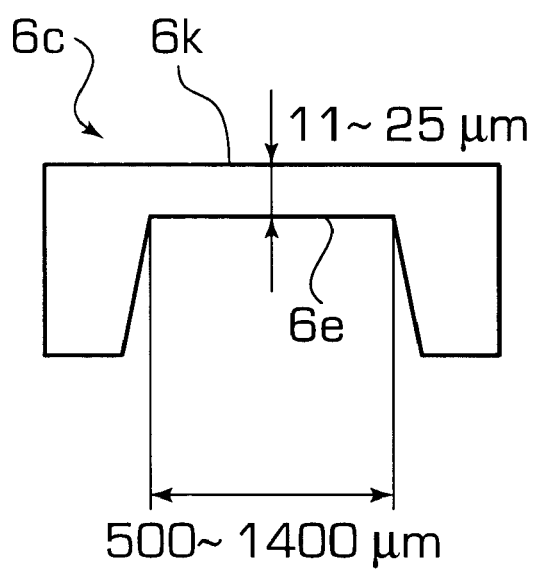
FIG. 3 is a side elevational view showing schematically a structure of a diaphragm constituting a part of the pressure sensor.

FIG. 2 is a side elevational view showing in section a structure of the pressure sensor employed in the evaporative fuel leak diagnosing apparatus according to the instant embodiment of the invention, and FIG. 3 is a schematic side view showing a structure of a diaphragm.

Figure 6:
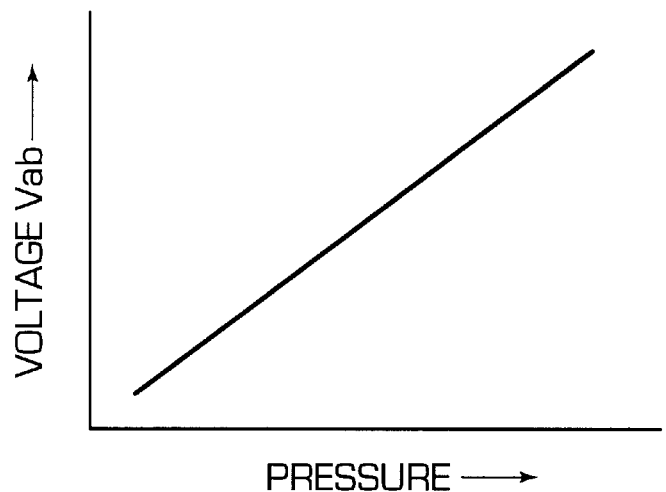
FIG. 6 is a characteristic diagram of the diaphragm in a linear region.

Referring to FIG. 2, the pressure sensor 6A is composed of a diaphragm 6c, a distortion detector 6d for detecting distortion of the diaphragm 6c, and an amplifier circuit 6a for amplifying and shaping the output of the distortion detector in order to obtain a desired output characteristic such as illustrated in FIG. 6, wherein the diaphragm 6c, the distortion detector and the amplifier circuit 6a are mounted as enclosed within a case 6j. Concerning the desired output characteristic of the pressure sensor, description will be made later on.

Referring to FIG. 2, the diaphragm 6c is fixedly secured to a cylindrical mount 6g which in turn is secured onto a stem 6f. A pressure introducing pipe 6b (nipple) is mounted on the stem 6f at a center portion thereof so as to communicate with a cylindrical through-hole formed in the cylindrical mount 6g and a through-hole 6h of the stem 6f. The diaphragm 6c has a pressure receiving surface 6e to which the pressure prevailing within the fuel tank 1 is applied by way of the pressure introducing pipe 6b. As can be seen in FIG. 1, the pressure introducing pipe 6b is sealed off from the atmosphere by means of an O-ring 6d mounted on and along an inner periphery of the case 6j. On the other hand, the other pressure receiving surface 6k of the diaphragm 6c is communicated to the atmosphere by way of caps 6m and the case 6j. The caps 6m is secured to the stem 6f, wherein the diaphragm 6c and electrodes 6n and 6p extending through the stem 6f and connected to lateral portions of the diaphragm 6care accommodated with an inner chamber or space defined by the cap 6m and the stem 6f. The case 6j is mounted at a free end of the blanch pipe 2d of the fuel pipe system 2.

At this juncture, it should be mentioned that the pressure generated by evaporation of the fuel within the fuel tank 1 is extremely low and usually lies within a range of −5 kPa to +2 kPa. Under the circumstances, the diaphragm 6c of the pressure sensor 6A is realized in a very thin structure having a very large pressure receiving surface area so that such very low or feeble pressure can be detected. As a typical example, the diaphragm 6c may be so realized that the pressure receiving surface 6e presents a square shape having sides each of a length of 500 $\mu$ to 1400 $\mu$ and a thickness of 11 to 25 $\mu$, as illustrated in FIG. 3. By employing the very thin diaphragm 6c having a large pressure receiving surface area as mentioned above, the output voltage signal of a Wheatstone bridge circuit formed integrally on the pressure receiving surface of the diaphragm 6c for detecting distortion of the diaphragm 6c can change significantly even in response to a very small change in the pressure of the fuel vapor introduced to the pressure sensor. Parenthetically, the Wheatstone bridge circuit may be realized by using strain gauge elements which are known in the art.

Figure 4:
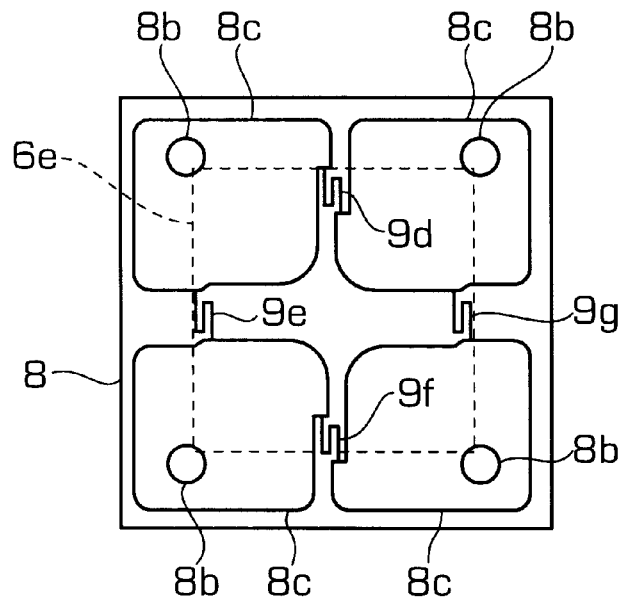
FIG. 4 is a top plan view of the diaphragm.

FIG. 4 is a top plan view of the diaphragm 6c. The diaphragm 6c is made of a silicon substrate having a mid area in which the pressure receiving surface 6e of a square shape is formed by etching or the like process, as indicated by a broken line in FIG. 4. Metal electrodes 8b formed of aluminum or gold are deposited at corners of the silicon substrate, respectively. Deposited on each of the metal electrodes 8b is a conductor 8c which is formed of a $P^+$-diffusion layer. Interposed and connected between pairs of the adjacent conductors 8c are piezo-resistance elements 9d to 9g, respectively, whereby the Wheatstone bridge circuit for detecting distortion of the diaphragm 6c is realized.

Figure 5:
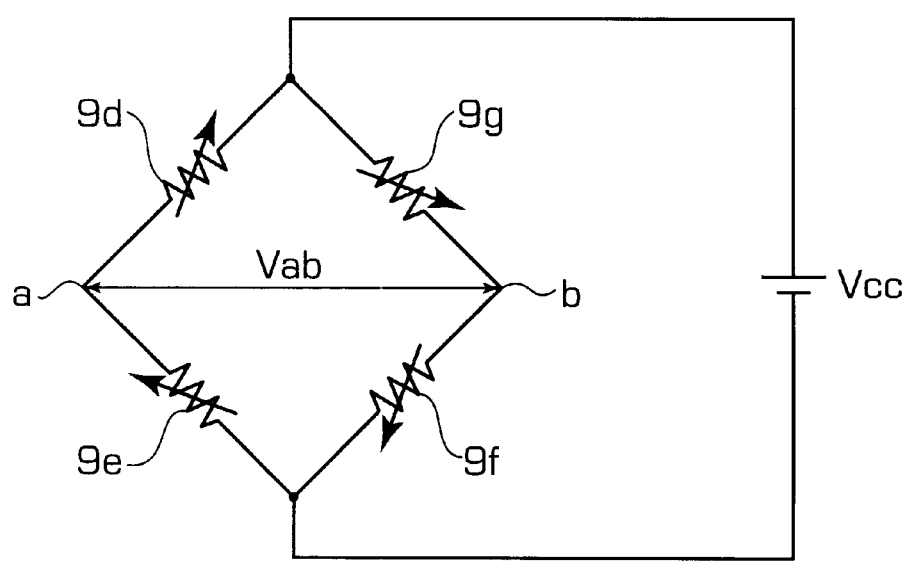
FIG. 5 is a circuit diagram showing a Wheatstone bridge circuit serving as a diaphragm-distortion detector.

FIG. 5 is a circuit diagram showing the above mentioned Wheatstone bridge circuit composed of the piezo-resistance elements 9d to 9g. In this conjunction, it should be noted that the piezo-resistance elements 9d to 9g (which may also be referred to as the gauge resistors) have a same resistance value. When the diaphragm 6c is geometrically displaced or distorted under application of pressure, the resistance values of the piezo-resistance elements 9d to 9gchange in correspondence to the deformation occuring under the piezo-resistance effect, as a result of which a voltage Vab makes appearance across terminals a and b. This voltage Vab is in direct proportion to the pressure P applied to the diaphragm 6c on the condition that the pressure applied to the diaphragm does not exceed a predetermined value. To say in another way, the voltage Vab exhibits linearity as a function of the pressure P, as is shown in FIG. 6.

However, when the pressure sensor 6A is implemented very thin while having a large pressure receiving surface in view of the fact that the pressure generated within the fuel tank 1 (or change in pressure within the fuel tank 1) is very low or feeble, deflection of the diaphragm which can not be neglected in consideration of the thickness of the diaphragm may take place at a certain pressure level, which in turn gives rise to occurrence of a non-linearity in the output characteristic of the Wheatstone bridge circuit, which is known as the balloon effect in the art.

Figure 7:
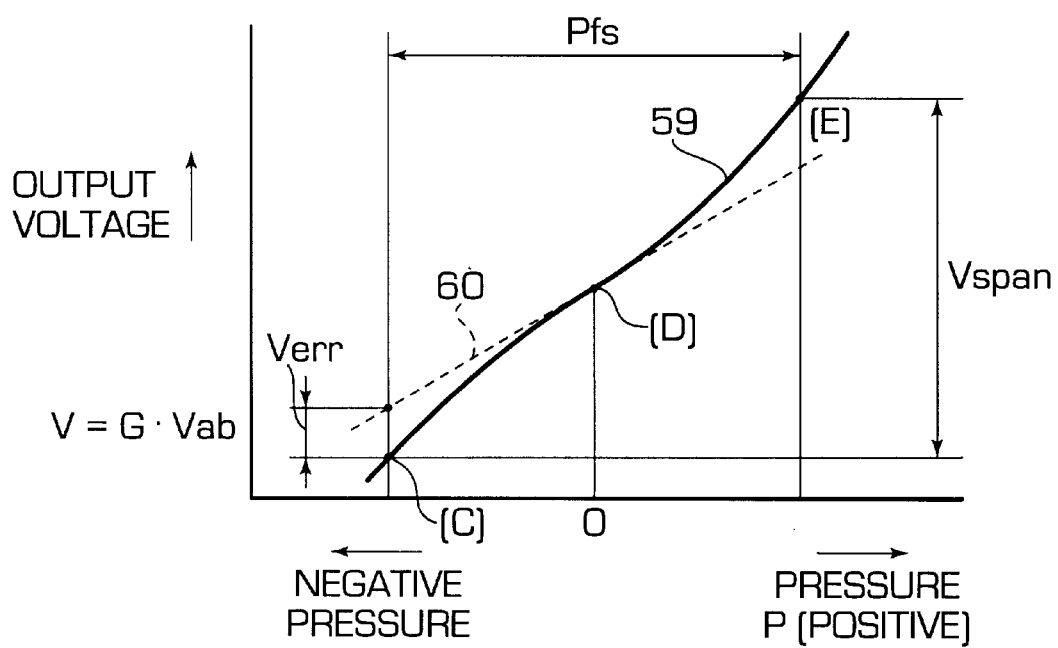
FIG. 7 is a characteristic diagram of the diaphragm in a non-linear region.

More specifically, the non-linearity mentioned above makes appearance in the relation between the applied pressure (i.e., pressure applied to the diaphragm) and the output voltage (i.e., output voltage of the pressure sensor), as can be seen in FIG. 7. Such non-linearity may differ in dependence on the lattice plane of the semiconductor material forming the diaphragm structure, size and thickness thereof, positions of the diffused resistances, applied voltage and other factors.

For convenience' sake of description, the range of the pressure to be measured is referred to as the full scale and represented by Pfs. The output level of the pressure sensor when the applied pressure is zero is represented by (D), and the output level at a lower limit of the full scale Pfs is represented by (C). Additionally, deviation (error) from an ideal characteristic 60 indicated by a broken line at the lower limit of the full scale Pfs is represented by Verr.

Figure 8:
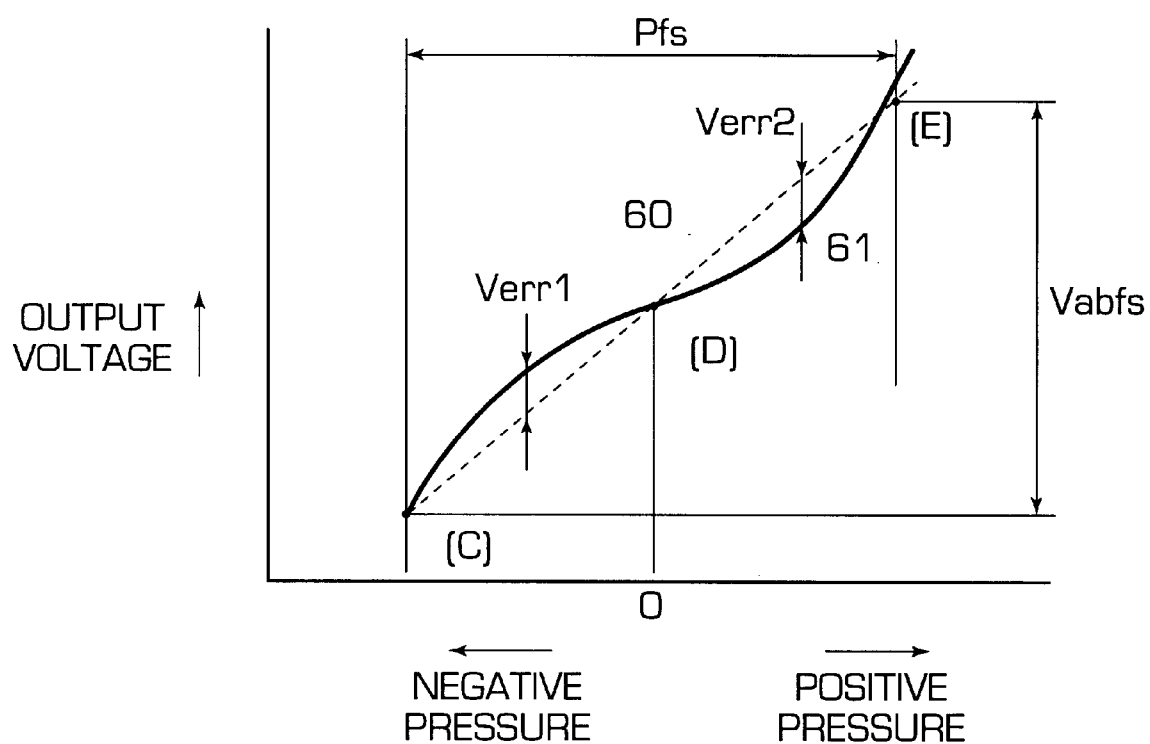
FIG. 8 is a characteristic diagram for graphically illustrating approximation of a pressure sensor output signal with quadratic expressions.

Ordinarily, with a view to facilitating the processing of the output signal of the pressure sensor, the output voltage of the Wheatstone bridge circuit illustrated in FIG. 7 is amplified to a voltage V=G·Vab (where G represents an amplification gain) and corrected (by resorting to approximation with quadratic expressions or curves in this case) for obtaining the desired characteristic. To this end, it is required that adjustment of the characteristic should be performed at least at two points. Thus, when the sensor output 59 exhibiting the characteristic illustrated in FIG. 7 is adjusted at the points (C) and (D) so that the error or deviation from the ideal characteristic 60 becomes zero, there can be obtained such an output signal as illustrated in FIG. 8. At this juncture, it should be appreciated that the amplifier circuit 6a provided in association with the pressure sensor 6A (see FIG. 1) outputs the voltage signal indicating the distortion of the diaphragm 6c as detected by the Wheatstone bridge circuit with the characteristic illustrated in FIG. 8.

However, when the voltage signal derived from the Wheatstone bridge circuit is adjusted with the quadratic approximations at the points (C) and (D) in an effort to realize the characteristic conforming to the ideal one, the actual characteristic will become such as represented by a curve 61 in FIG. 8, which is still accompanied with errors or deviations $Verr_1$ and $Verr_2$ from the ideal characteristic 60. Such deviation or error increases as the full scale Pfs is set narrower for a given span voltage, while for a given full scale Pfs, the error increases as the span voltage becomes higher. Data experimentally obtained in this conjunction are illustrated in FIGS. 9 to 11.

Figure 9:
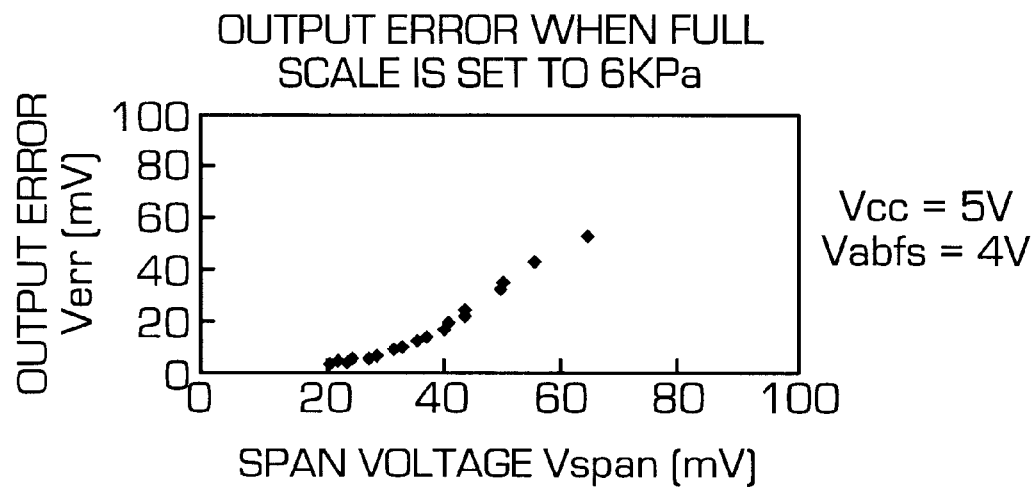
FIG. 9 is a view for graphically illustrating deviations or errors of an output signal of a pressure sensor when a full scale is set to 6 kPa.
Figure 10:
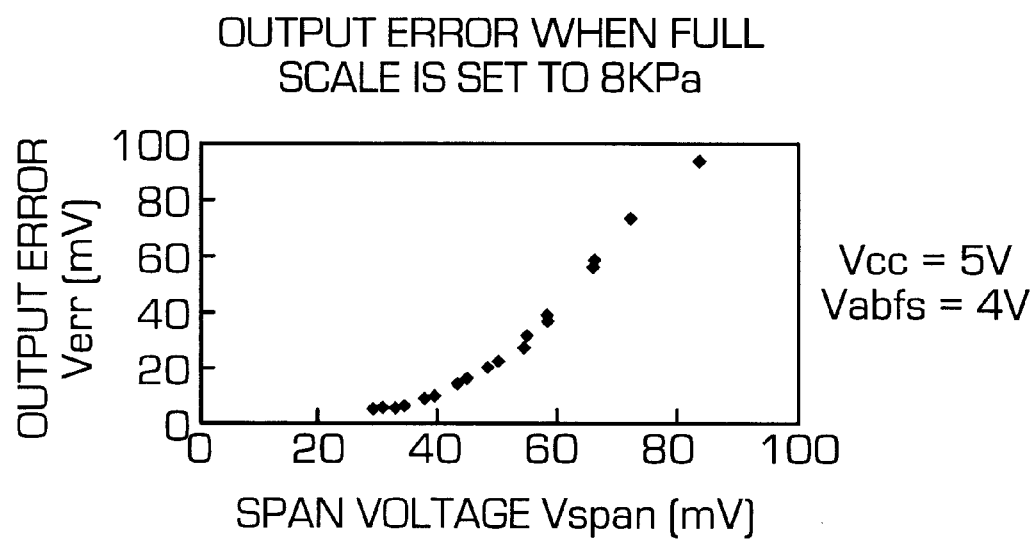
FIG. 10 is a view for graphically illustrating deviations or errors of an output signal of a pressure sensor when a full scale is set to 8 kPa.
Figure 11:
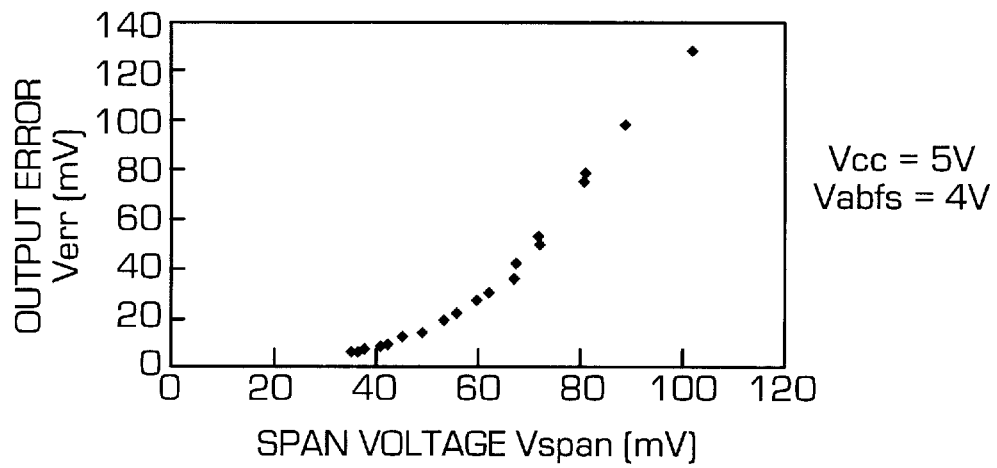
FIG. 11 is a view for graphically illustrating deviations or errors of an output signal of a pressure sensor when a full scale is set to 10 kPa.

More specifically, FIG. 9 is a view for graphically illustrating deviations or errors of the output signal of the pressure sensor as a function of the span voltage when the full scale Pfs is set to 6 kPa, FIG. 10 is a view for graphically illustrating deviations of the output signal of the pressure sensor as a function of the span voltage when the full scale Pfs is at 8 kPa, and FIG. 11 is a view for graphically illustrating deviations of the output signal of the pressure sensor as a function of the span voltage when the full scale Pfs is at 10 kPa, all of which have been experimentally obtained.

As can be seen from FIGS. 9 to 11, the error or deviation can be reduced by using the pressure sensor of a low-rated span voltage. In that case, however, the gain for amplification has to be selected high, incurring a problem that the error due to the temperature dependent characteristic of the pressure sensor is amplified and remarkable error in the characteristic is involved in the initial phase of operation. Since the evaporative fuel leak diagnosing apparatus is intrinsically designed for measuring or detecting minute variation in the pressure within the fuel tank 1, it is necessarily required to use the pressure sensor having a large span voltage range. In that case, the linearity of the output signal of the pressure sensor will suffer remarkable variation.

Figure 12:
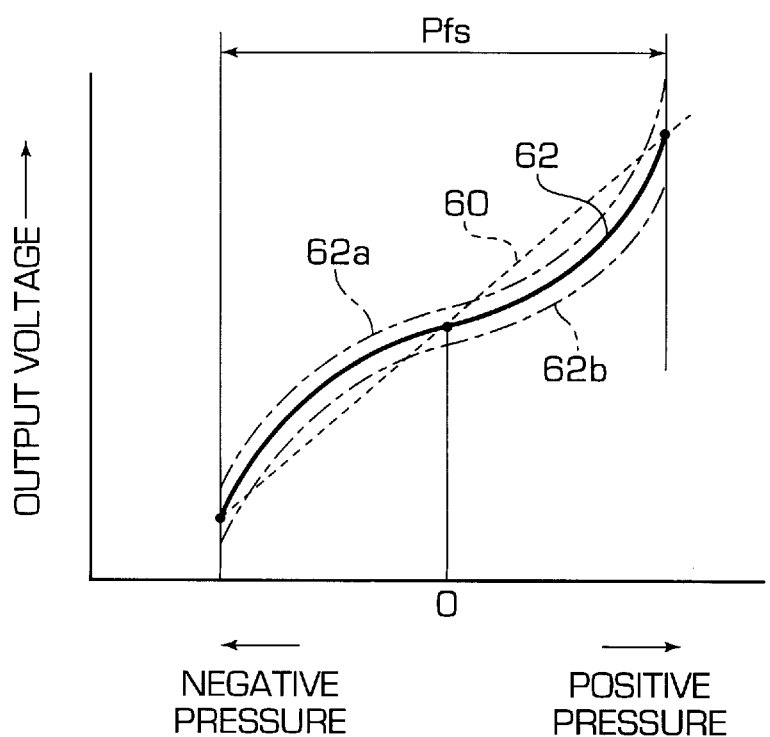
FIG. 12 is a view for graphically illustrating exemplary outputs of a pressure sensor exhibiting non-linearity.

For the reasons described above, in the evaporative fuel leak diagnosing apparatus according to the teaching of the present invention incarnated in the first embodiment thereof, it is presumed upon fetching of the pressure detection signal of the pressure sensor 6A into the computer unit 50A that the output signal of the pressure sensor does not actually exhibit the linearity but exhibits non-linearity such as represented by a characteristic curve 62 illustrated in FIG. 12, and a plurality of the output voltages of the pressure sensor actually measured at a plurality of discrete pressure levels applied to the diaphragm are registered in advance in the computer unit 50A in the form of a table, to thereby check comparatively the pressure detection signal (voltage signal) outputted actually from the pressure sensor 6A with the corresponding one of the registered voltage values with a view to detecting the actually generated fuel vapor pressure with high accuracy.

Figure 13:
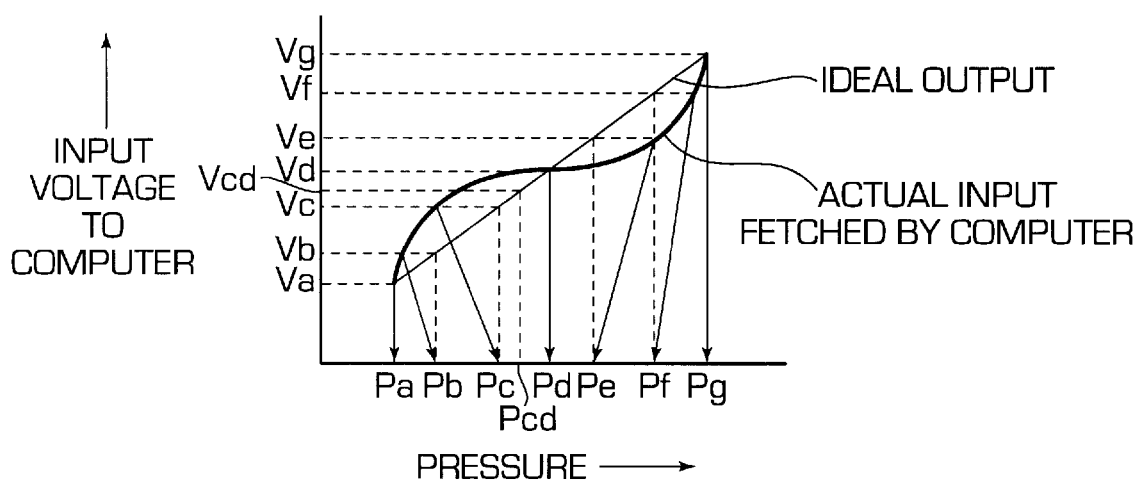
FIG. 13 is a view for graphically illustrating a method of detecting a pressure generated within a fuel tank according to a first embodiment of the invention.

FIG. 13 is a view for graphically illustrating a method of detecting the pressure generated within the fuel tank 1 according to the first embodiment of the invention. Referring to FIG. 13, the actual pressures Pa, Pb, Pc, Pd, Pe, Pf and Pg, i.e., pressure values determined experimentally are previously registered in correspondence to the output voltages Va, Vb, Vc, Vd, Ve, Vf and Vg, respectively, in the computer unit 50A. In the actual operation of the evaporative fuel leak diagnosing apparatus, when the output voltage of the pressure sensor 6A is at the level Va, then the pressure within the fuel tank 1 is determined to be at the level Pa on the basis of the registered data. Similarly, when the output voltage of the pressure sensor 6A is at the level Vb, it is then determined that the pressure within the fuel tank 1 is at the level Pb on the basis of the registered data. Similar processing is executed for determining the pressures Pc . . . . and Pg upon detection of the output voltages Vc, . . . and Vg, respectively.

By contrast, it is now assumed, only by way of example, that an output voltage Vcd is read out from the pressure sensor and that the actual pressure Pcd corresponding to the output voltage Vcd is not registered in the computer unit. In that case, the pressure value Pcd is arithmetically estimated by interpolation on the basis of the registered pressure values Pc and Pd corresponding to the output voltages Vc and Vd in accordance with the following expression (1):

$$Pcd=\{(Pd-Pc)/(Vd-Vc)\}(Vcd-Vc)+Pc \qquad (1)$$

Parenthetically, double-dotted broken lines 62a and 62b shown in FIG. 12 represent upper and lower limits, respectively, which the sensor output may assume. The data registered in the computer unit lie within the range defined by these curves 62a and 62b. Needless to say, these data lacks in linearity of the characteristic.

The pressure detection described above may be performed periodically for a predetermined time after the fuel tank 1 has been hermetically sealed off or isolated from the atmosphere and the intake manifold of the internal combustion engine by the seal-off means which are constituted by the drain cut valve 5 and the purge cut valve 4. When the increasing rate of the detected fuel vapor pressure within the fuel tank 1 assumes a predetermined value, it is then decided that leakage of the fuel vapor is taking place.

Embodiment 2.

Figure 14:
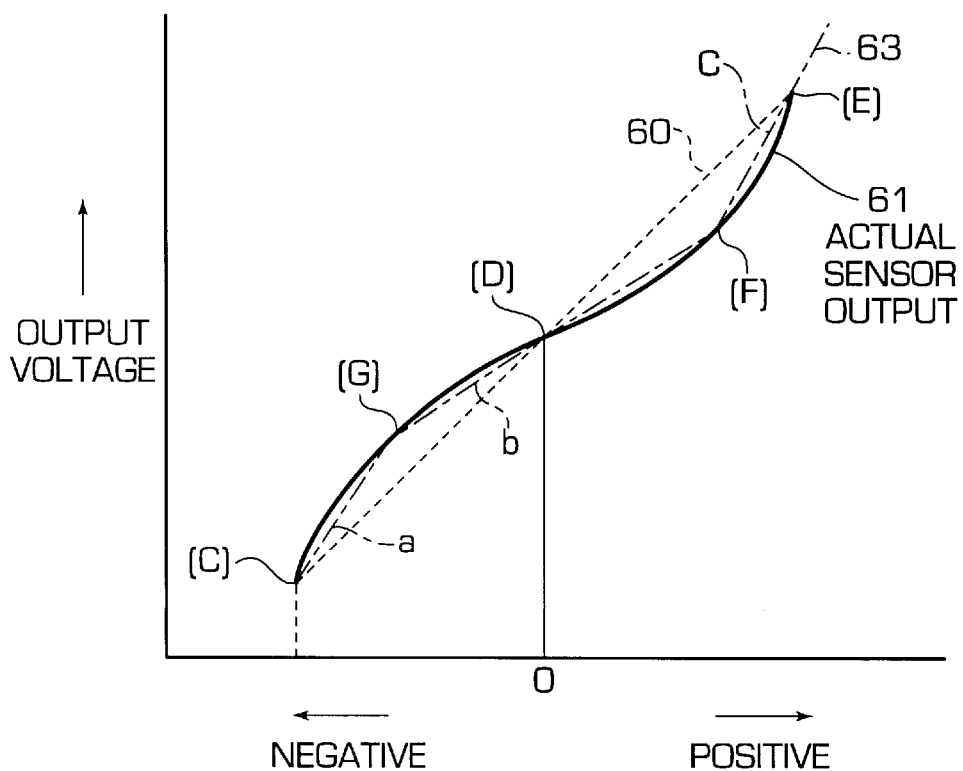
FIG. 14 is a diagram for graphically illustrating, a method of arithmetically determining a fuel vapor pressure within a fuel tank according to a second embodiment of the invention.

FIG. 14 is a diagram for graphically illustrating a method of arithmetically determining the fuel vapor pressure according to a second embodiment of the present invention. According to the teaching of the invention incarnated in the instant embodiment, polygonal-line approximating expressions represented by a double-dotted broken line 63 in FIG. 14 are inputted previously to the computer unit 50A to be stored therein for reference upon reading of the output signal of the pressure sensor with a view to arithmetically determining the fuel vapor pressure by fitting the output signal of the pressure sensor to the polygonal-line approximating expression to thereby ensure high accuracy for the determination of the fuel vapor pressure while avoiding linearity error.

Figure 15:
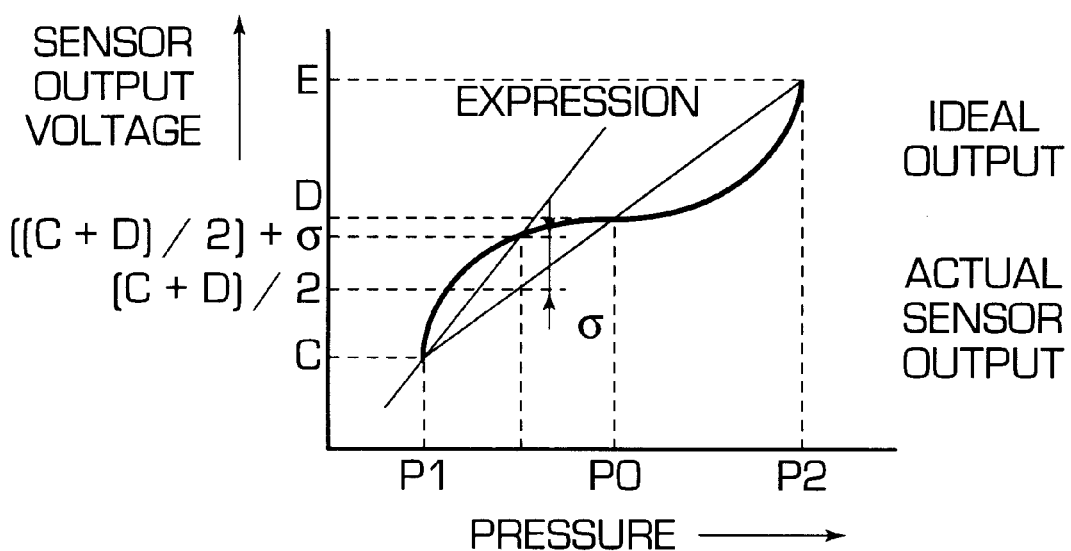
FIG. 15 is a diagram for graphically illustrating a method of defining polygonal-line approximating expressions.
Figure 16:
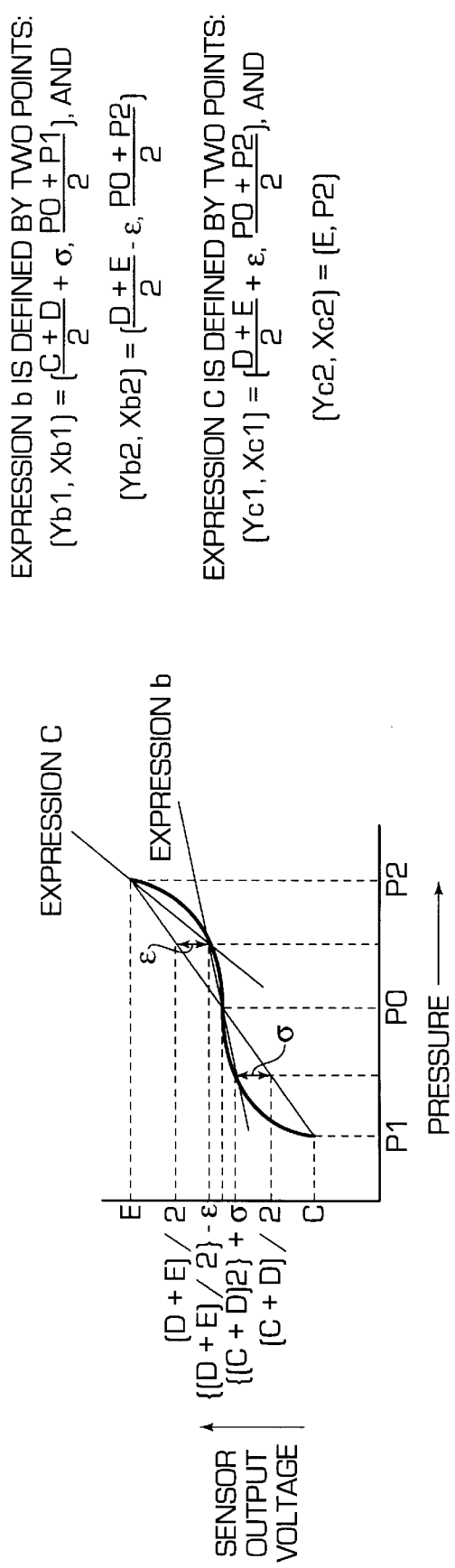
FIG. 16 is a diagram for graphically illustrating a method of defining polygonal-line approximating expressions.

FIGS. 15 and 16 are diagrams for graphically illustrating a method of obtaining the polygonal-line approximating expressions.

At first, the offset voltage D and the span voltage C are adjusted, respectively, to predetermined values for determining the characteristic of the pressure sensor 6A, as described hereinbefore by reference to FIG. 8. This can be realized by using the amplifier circuit 6a shown in FIG. 1. Accordingly, the errors at these values are suppressed to minimum. Due to the non-linearity of the pressure sensor, the output thereof will deviate from the predetermined linear output. Representing this deviation by σ, the deviation σ becomes maximum at a mid point between the values or points C and D. Further, the actual value of the deviation a is generally determined by the size and the thickness of the diaphragm and can be experimentally obtained. In the first place, a polygonal-line approximating expression a (see FIGS. 14 and 15) is defined on the basis of the predetermined output voltage at the point C and an output voltage usually obtained at a mid point between the points C and D when the output characteristic of the pressure sensor is linear (i.e., the voltage y=(C+D)/2) and added with the deviation σ, i.e., (y+σ). The polygonal-line approximating expressions b and c can be defined similarly.

More specifically, the polygonal-line approximating expression b can be defined on the basis of two points determined by the following expressions (2) and (3):

$$(Y_{b1}, X_{b1}) = ((C+D)/2+\sigma, (P_0+P_1)/2) \quad (2)$$

$$(Y_{b2}, X_{b2}) = ((D+E)/2-\epsilon, (P_0+P_2)/2) \quad (3)$$

Similarly, the polygonal-line approximating expression c can be defined on the basis of the two points determined by the following expressions (4) and (5):

$$(Y_{c1}, X_{c1}) = ((D+E)/2-\epsilon, (P_0+P_2)/2) \quad (4)$$

$$(Y_{c2}, X_{c2}) = (E, P_2) \quad (5)$$

In the case of the instant embodiment of the invention, the output characteristic of the pressure sensor is approximated with the polygonal line curves having two inflection points (F) and (G), i.e., with three polygonalline approximating expressions a, b and c (see FIG. 16). It goes however without saying that the output characteristic of the pressure sensor can equally be approximated with a polygonal line curve having three or more inflection points (points at which the polygonal-line curve contacts the output curve of the pressure sensor), i.e., with a polygonal line curve defined by four or more expressions.

Embodiment 3

Figure 17:
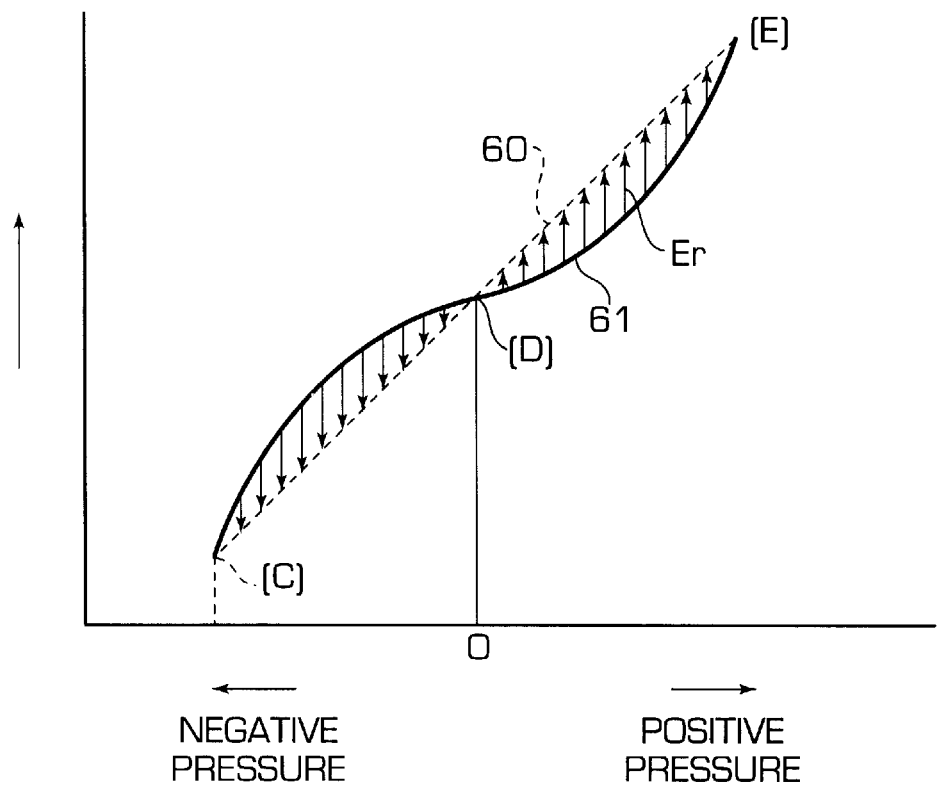
FIG. 17 is a diagram for graphically illustrating a method of arithmetically determining a fuel vapor pressure within a fuel tank according to a third embodiment of the present invention.

FIG. 17 is a diagram for graphically illustrating a method of avoiding the linearity error in the pressure sensor output according to a third embodiment of the present invention. As can be seen in FIG. 17, it is assumed that the actual output voltage 61 of the pressure sensor lacks in linearity and exhibits displacement or deviation from the ideal characteristic 60 by a deviation Er. According to the teaching of the invention incarnated in the instant embodiment, a correcting quantity corresponding to the deviation Er is previously inputted to the computer unit 50A to be registered therein for reference upon reading the output signal of the pressure sensor, wherein the deviation Er (correcting quantity, to say in another way) is added to the output signal of the pressure sensor to thereby avoid the linearity error.

Before entering into description of the instant embodiment, it should be recalled that in the case of the evaporative fuel leak diagnosing apparatus according to the first embodiment of the invention, the voltage value is converted into the pressure value by referencing the table in which the voltage values experimentally obtained as a function of the pressure level are previously registered in the computer unit. However, because all the relevant voltage values can not be registered, representative ones are inputted, and when a voltage value as fetched is an interim value between the representative ones registered, then the interpolation processing is performed for obtaining the corresponding pressure value. By contrast, in the evaporative fuel leak diagnosing apparatus according to the third embodiment of the invention, correcting values are registered in advance for the individual output voltages of the pressure sensor, respectively, wherein the voltage value fetched from the pressure sensor is corrected by the corresponding correcting quantity or value before undergoing the linear conversion to the pressure value. However, because all the relevant correcting quantities can not be stored in this case either, only the representative ones are registered. Accordingly, when an interim value is fetched by the computer unit, then the interpolation processing is performed by using the representative values similarly to the case of the evaporative fuel leak diagnosing apparatus according to the first embodiment. Parenthetically, the correcting quantities or values are determined by the thickness and the size of the diaphragm of the pressure sensor and can experimentally be determined in advance.

Figure 18:
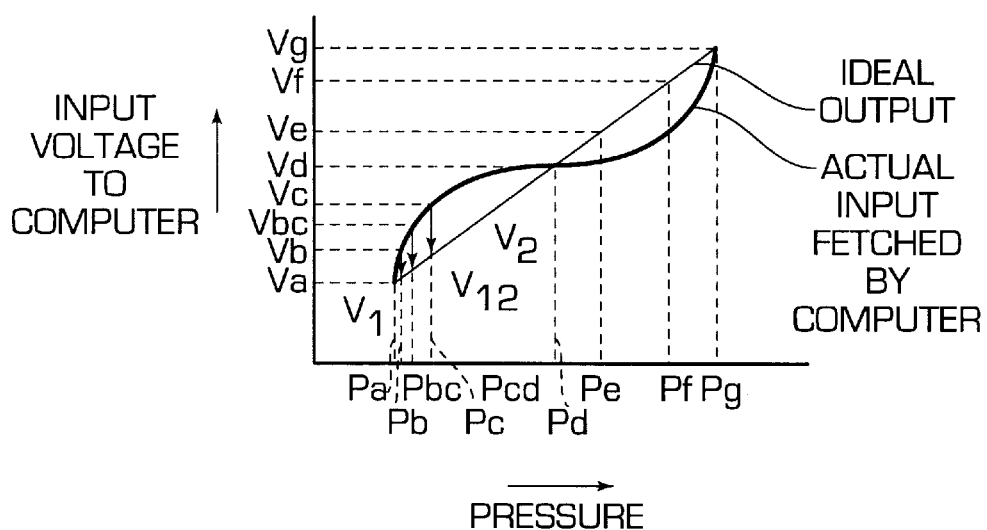
FIG. 18 is a diagram for graphically illustrating a method of deriving correcting quantities for realizing an ideal characteristic of a pressure sensor in the method illustrated in FIG. 17.

FIG. 18 is a diagram for illustrating in more concrete the concept of the invention incarnated in the third embodiment.

Referring to FIG. 18, when the output voltage of the pressure sensor assumes a value Va, no correction is performed (i.e., the correcting quantity is zero). When the output voltage is Vb, a voltage V1 is added as the correcting quantity. The output voltages Vc to Vg are processed similarly. Now, it is assumed, by way of example, that an output voltage Vbc is fetched. Then, the pressure is actually at a level Pbc. However, because the correcting voltage quantity corresponding to this output voltage is not registered in the computer unit, the interpolation processing is performed by using map values V1 and V2 for the voltages Vb and Vc, respectively, in accordance with the following expression:

$$V_{12} = (V1+V2)/2 \quad (6)$$

In this manner, the output characteristic of the pressure sensor can be corrected so as to approach the ideal output characteristic.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although it has been described that the diaphragm is realized in a square form, it goes without saying that the diaphragm of any other suitable shape may be used. Besides, the invention is never restricted to the specific diaphragm structure disclosed herein. Furthermore, the basic concept of the present invention may find application to the evaporative fuel leak diagnosing apparatus for the internal combustion engine in which other type of pressure sensor than that disclosed herein is employed, for the purpose of compensating for non-linearity of the output characteristic of the pressure sensor.

Accordingly, all suitable modifications and equivalents may be resorted to, falling within the spirit and scope of the invention.

What is claimed is:

1. An evaporative fuel leak diagnosing apparatus for an internal combustion engine, comprising:

pressure sensor means for detecting a pressure within a fuel tank containing an evaporative fuel to be supplied to said internal combustion engine through an intake manifold;

fuel tank seal-off means for isolating hermetically said fuel tank from said intake manifold and the atmosphere; and computer means for fetching directly a non-linear output signal that is representative of said pressure sensor as a function of a known set of previously registered data in an engine operating state where said fuel tank is hermetically isolated by said seal-off means, determining a pressure detection value indicative of a pressure level prevailing within said fuel tank on the basis of said non-linear output value obtained from said pressure sensor and data registered previously on the basis of the non-linear output values from said pressure sensor, and making a decision as to leakage of said evaporative fuel on the basis of a rate at which said pressure detection value increases.

2. An evaporative fuel leak diagnosing apparatus according to claim 1, wherein a plurality of output values generated by said pressure sensor in response to a plurality of pressure values applied to said pressure sensor, respectively, are registered in advance in said computer means for use as said data to be referenced, and wherein when a pressure value corresponding to any one of said plural registered output values is fetched from the output of said pressure sensor, the registered pressure value corresponding to said output value is used as said applied pressure detection value, while when the output value corresponding to none of said plural registered output values is fetched from the output of said pressure sensor, said pressure detection value is arithmetically determined by resorting to an interpolation processing based on said plural registered output values and the applied pressure values corresponding thereto.

3. An evaporative fuel leak diagnosing apparatus according to claim 1, wherein said computer means arithmetically determines the detection value of pressure within said fuel tank in accordance with polygonal-line approximating expressions which approximate output behavior of said pressure sensor and which are registered previously in said computer means.

4. An evaporative fuel leak diagnosing apparatus for an internal combustion engine comprising:

pressure sensor means for detecting a pressure within a fuel tank containing an evaporative fuel to be supplied to said internal combustion engine through an intake manifold;

fuel tank seal-off means for isolating hermetically said fuel tank from said intake manifold and the atmosphere; and computer means for fetching directly a non-linear output signal that is representative of said pressure sensor as a function of a known set of previously registered data in an engine operating state where said fuel tank is hermetically isolated by said seal-off means, determining a pressure detection value indicative of a pressure level prevailing within said fuel tank on the basis of said non-linear output value obtained from said pressure sensor and data registered previously on the basis of the non-linear output values from said pressure sensor, and making a decision as to leakage of said evaporative fuel on the basis of a rate at which said pressure detection value increases, wherein a plurality of output values generated by said pressure sensor in response to a plurality of pressure values applied to said pressure sensor and correcting quantities therefor are registered for use as data previously in said computer means, and wherein a pressure value corresponding to when any one of said plural registered output values is fetched from one of said plurality of registered output values is fetched from the output of said pressure sensor, the pressure detection value is arithmetically determined on the basis of said output pressure value and the registered correcting quantity corresponding to said output pressure value, while when the output value corresponding to none of said plural registered output values is fetched from the output of said pressure sensor, said pressure detection value is arithmetically determined by resorting to interpolation processing based on said plural registered output values and said correcting qualities corresponding thereto.

5. An evaporative fuel leak diagnosing apparatus for an internal combustion engine comprising:

pressure sensor means for detecting a pressure within a fuel tank containing an evaporative fuel to be supplied to said internal combustion engine through an intake manifold;

fuel tank seal-off means for isolating hermetically said fuel tank from said intake manifold and the atmosphere; and computer means for fetching directly a non-linear output signal that is representative of said pressure sensor as a function of a known set of previously registered data in an engine operating state where said fuel tank is hermetically isolated by said seal-off means, determining a pressure detection value indicative of a pressure level prevailing within said fuel tank on the basis of said non-linear output value obtained from said pressure sensor and data registered previously on the basis of the non-linear output values from said pressure sensor, and making a decision as to leakage of said evaporative fuel on the basis of a rate at which said pressure detection value increases, wherein said pressure sensor comprises a diaphragm having pressure receiving surfaces exposed to atmosphere and an interior of said fuel tank, respectively, and gage resistors for detecting distortion of said pressure receiving surface, respectively, on the plurality of output values generated by said pressure sensor in response to a plurality of pressure values applied to pressure sensor respectively are registered in advance in said computer means for use as said.

6. An evaporative fuel leak diagnosing apparatus for an internal combustion engine, comprising:

a pressure sensor operative to detect a pressure within a fuel tank containing an evaporative fuel to be supplied to said internal combustion engine through an intake manifold;

a plurality of fuel tank seal-off valves for isolating hermetically said fuel tank from said intake manifold and the atmosphere; and a processor operative to fetch directly a non-linear output signal that is representative of said pressure sensor as a function of a known set of previously registered data in an engine operating state where said fuel tank is hermetically isolated by said seal-off means, determining a pressure detection value indicative of a pressure level prevailing within said fuel tank on the basis of said non-linear output value obtained from said pressure sensor and data registered previously on the basis of the non-linear output values from said pressure sensor, and making a decision as to leakage of said evaporative fuel on the basis of a rate at which said pressure detection value increases.

7. An evaporative fuel leak diagnosing apparatus according to claim 6, wherein said previously registered output is a correction quantity that is added to the output signal of the pressure sensor to avoid a linearity error.

8. An evaporative fuel leak diagnosing apparatus according to claim 6, wherein said previously registered output is a correction quantity that corrects the voltage value before undergoing a linear conversion to a pressure value to avoid a linearity error.

\* \* \* \* \*